United States Patent Office
3,320,269
Patented May 16, 1967

3,320,269
β-AMINO-α-PHENOXY-2-STILBAZOLE DERIVATIVES
Horace A. De Wald, Ann Arbor, Mich., assignor to Parke, Davis & Company, Detroit, Mich., a corporation of Michigan
No Drawing. Filed July 19, 1963, Ser. No. 296,388
5 Claims. (Cl. 260—296)

The present invention relates to aromatic ethers. More particularly, it relates to aromatic ethers which can be represented in free base form by the formula

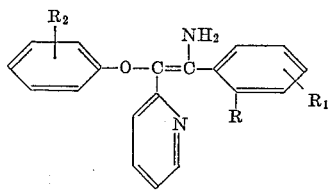

and to methods for their production; where R represents halogen, lower alkyl, lower alkoxy, trifluoromethyl, or methylthio; $R_1$ represents hydrogen, halogen, methyl, or methoxy; R and $R_1$ at position 3 also being combinable as the —CH=CH—CH=CH— radical so that the entire group

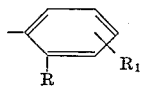

represents 1-naphthyl; and $R_2$ represents hydrogen, halogen, lower alkyl, or lower alkoxy. In the compounds of the invention, the preferred lower alkyl groups are those containing not more than three carbon atoms and the preferred halogen is chlorine. Moreover, the preferred compounds of the invention with respect to high pharmacological activity and relative ease of production are those in which $R_2$ represents hydrogen.

Although in the foregoing general formula the compounds of the invention are represented as having an amine structure, this is only one of the equivalent tautomeric interconversion between tautomeric forms of the eric forms in which these compounds can exist. The compounds of the invention is illustrated by the following equation.

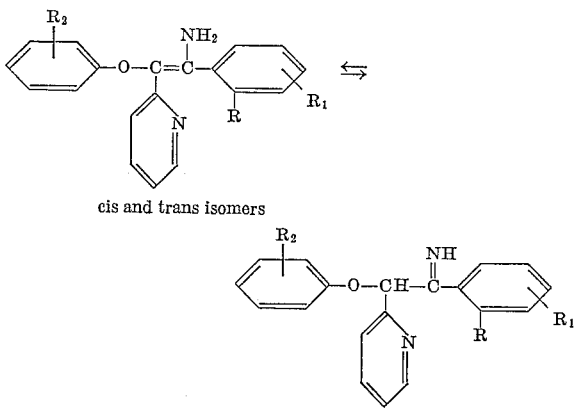

cis and trans isomers

In any particular compound of the invention, one of the indicated tautomeric forms, that is the imine, the cis enamine or the trans enamine, may be favored by such factors as acidic or basic conditions or solvent. For reasons of convenience, the compounds of the invention are consistently formulated and named as having the amine structure but because of the equilibrium state which can exist among the tautomeric forms, it will be appreciated that the amine structure includes the various tautomers indicated above. For purposes of chemical nomenclature, the compounds of the invention can be regarded as amino derivatives of 2-stilbazole,

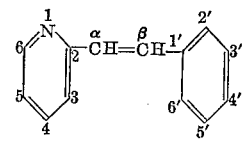

In accordance with the invention, the foregoing compounds are produced by reacting a benzonitrile compound of the formula

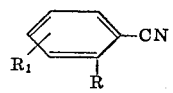

with a reactive metal derivative of an aryloxymethylpyridine compound of the formula

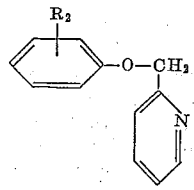

under anhydrous conditions, followed by hydrolysis of the resulting reaction product; where R, $R_1$, and $R_2$ are as defined before. Some examples of suitable reactive metal derivatives are the lithium, sodium, potassium, and magnesium halide derivatives. The preferred reactive metal derivatives are the alkali metal derivatives which can be prepared by reacting the aryloxymethylpyridine compound with such reagents as phenyllithium, butyllithium, lithium hydride, sodium hydride, sodamide, or potassium diethylamide. Of the preferred alkali metal derivatives, the lithium derivative is the most suitable. If the magnesium halide derivative is desired, it can be obtained by reaction of an alkali metal derivative with a magnesium halide. The first phase of the process is carried out by reacting the benzonitrile compound with a reactive metal derivative, such as the lithium derivative, of the aryloxymethylpyridine compound under anhydrous conditions. This phase of the process is normally carried out in a non-hydroxylic solvent and the benzonitrile compound and the reactive metal derivative of the aryloxymethylpyridine compound are usually employed in approximately equimolar quantities although if desired an excess of either can be used. Some examples of suitable non-hydroxylic solvents are ethers, ether-hydrocarbon mixtures, tetrahydrofuran, diethylene glycol dimethyl ether, N,N-dimethylformamide, and liquid ammonia. If desired, the reactive metal derivative of the aryloxymethylpyridine compound can be formed directly in the reaction mixture and used without isolation. The reaction of the benzonitrile compound with the reactive metal derivative of the aryloxymethylpyridine compound proceeds at a satisfactory rate at room temperature or below although a temperature within the range of about —35° C. to 110° C. or the reflux temperature of the solvent can be used. Preferably the reaction is carried out at reflux in a low boiling ether or ether-hydrocarbon mixture at about 35–65° C. Depending upon the temperature, the time required for substantial completion of the reaction varies between about 30 minutes and 24 hours. In the preferred temperature range, the reaction between the benzonitrile compound and the reactive metal derivative of the aryloxymethylpyridine compound is usually substantially complete within five hours. The desired product is then obtained following hydrolysis of the reaction mixture with water or other aqueous medium. To avoid excessive hydrolysis with formation of other products, the hydrolysis is carried out under mild conditions and prolonged contact with a strongly acidic or strongly basic hydrolysis medium is avoided.

The aryloxymethylpyridine compounds employed as starting materials are already known in some cases and in other cases can be prepared by reacting a 2-(halomethyl)pyridine in the presence of sodium hydride with a phenol of the formula

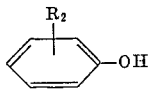

where R₂ is as defined before.

The compounds of the invention can also be produced by reducing compounds of the formula

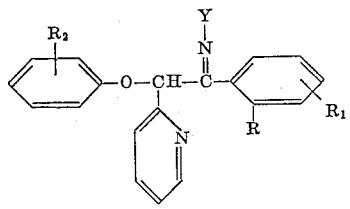

where Y is a hydroxyl, amino, lower monoalkylamino, or lower dialkylamino group and R, R₁, and R₂ are as defined before. The preferred method of reduction is catalytic hydrogenation with a Raney nickel catalyst. Other catalysts such as Raney cobalt can be used. Noble metal catalysts are avoided because they cause side reactions. The temperature and pressure employed depend on whether an oxime or a hydrazone is being used as starting material. In the hydrogenation of an oxime with Raney nickel catalyst, it is preferred to use hydrogen at a pressure of 1000–2000 pounds per square inch and a temperature of 50–100° C. with 2–25% by weight of Raney nickel. In the hydrogenation of a hydrazone, elevated pressures are not necessary and the reduction can be carried out with Raney nickel at 50–100° C. In this case the reduction can be accomplished using a relatively large amount of Raney nickel without a hydrogen atmosphere. Some examples of suitable solvents for use in the reduction are lower alkanols, lower alkanols containing ammonia, dioxane, tetrahydrofuran, and N,N-dimethylformamide. Depending on such factors as catalyst activity, the hydrogenation is carried out for about three hours or until the calculated amount of hydrogen has been absorbed.

The oximes and hydrazones employed as starting materials can be prepared by reacting the corresponding ketone with hydroxylamine, hydrazine, a lower monoalkylhydrazine, or an unsymmetrical lower dialkylhydrazine. The corresponding ketones required for reaction with hydroxylamine, hydrazine, a lower monoalkylhydrazine or an unsymmetrical lower dialkylhydrazine can be obtained by the reaction of the lithium derivative of an aryloxymethylpyridine compound of the formula

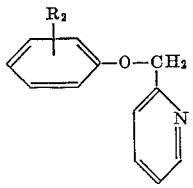

with a benzonitrile compound of the formula

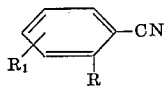

in a non-hydroxylic solvent, followed by reacting the product with a strong acid in aqueous medium; where R, R₁, and R₂ are as defined before. Alternatively, the ketones can be prepared by the reaction of the aforementioned lithium derivative with a compound of the formula

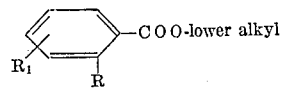

in a non-hydroxylic solvent, followed by the hydrolysis of the resulting reaction mixture; where R and R₁ are as defined before.

The compounds of the invention are preferably produced and used in the forms of their free bases. Alternatively by pH adjustment or by reaction of a free base with an acid, preferably under anhydrous conditions, the compounds of the invention can be produced and used in acid-addition salt form. The acid-addition salt forms are comparatively unstable because they tend to undergo hydrolysis or to revert to the free bases but in other respects they are equivalent to the free bases for the purposes of the invention.

The compounds of the invention are of value as pharmacological agents exhibiting hormonal properties and are also of value as chemical intermediates. They are ovulation inhibitors and consequently are useful as antifertility agents. In addition, they are hypocholesteremic agents and cause a lowering of blood cholesterol. They are active upon oral administration but can also be given by the parenteral route if desired.

The invention is illustrated by the following examples.

*Example 1*

A solution of 15 g. of 2-phenoxymethylpyridine in 70 ml. of ether is added at room temperature to a stirred solution of phenyllithium prepared from 1.5 g. of lithium and 16 g. of bromobenzene in 100 ml. of ether. The mixture obtained in this manner contains the lithium derivative of 2-phenoxymethylpyridine. Ten minutes later, a solution of 9.5 g. of o-methylbenzonitrile in 60 ml. of ether is added and the resulting red solution is heated at reflux for five hours, cooled to room temperature, and stirred with 250 ml. of water. The ether phase is separated, washed with saturated aqueous sodium chloride solution, dried over magnesium sulfate, and evaporated under reduced pressure to give a residue of β-amino-2′-methyl-α-phenoxy-2-stilbazole; M.P. 110–113° C. following crystallization from methanol.

By the foregoing procedure, with the substitution of an equivalent amount of o-isopropylbenzonitrile for the o-methylbenzonitrile, the product obtained is β-amino-2′-isopropyl-α-phenoxy-2-stilbazole, M.P. 107–111° C.

By the foregoing procedure, with the substitution of an equivalent amount of o-trifluoromethylbenzonitrile for the o-methylbenzonitrile, the product obtained is β-amino-2′-trifluoromethyl-α-phenoxy-2-stilbazole, M.P. 91–92° C.

By the foregoing procedure, with the substitution of an equivalent amount of o-chlorobenzonitrile for the o-methylbenzonitrile, the product obtained is β-amino-2′-chloro-α-phenoxy-2-stilbazole, M.P. 129–132° C.

*Example 2*

A solution of 26.4 g. of 2-(p-chlorophenoxymethyl) pyridine in 100 ml. of tetrahydrofuran is added at room temperature to a stirred solution of phenyllithium prepared from 2.1 g. of lithium and 24 g. of bromobenzene in 120 ml. of ether. The solution is stirred for ten more minutes and then a solution of 13 g. of o-methylbenzonitrile in 75 ml. of ether is added and the reaction mixture is heated at reflux for five hours, allowed to stand overnight at room temperature, and stirred with 200 ml. of water. The ether phase is separated, washed with saturated aqueous sodium chloride, dried over magnesium sulfate, and evaporated under reduced pressure to give a residue of β-amino-2′-methyl-α-(p-chlorophenoxy)-2- stilbazole; M.P. 91–94° C. following crystallization from methanol.

By the foregoing procedure, with the substitution of an equivalent amount of o-chlorobenzonitrile for the o-methylbenzonitrile, the product obtained is β-amino-2′-chloro-α-(p-chlorophenoxy)-2-stilbazole, M.P. 94–97° C.

The starting material can be obtained as follows. A solution of 38.4 g. of p-chlorophenol in 75 ml. of ether is added dropwise to a stirred solution of 13.5 g. of 54 percent sodium hydride (mineral oil suspension) in 150 ml. of ether. There are then added in succession an anhydrous solution of 2-(chloromethyl)pyridine (prepared from 50 g. of 2-(chloromethyl)pyridine hydrochloride and an equivalent amount of sodium hydroxide) in 100 ml. of ether, followed by 65 ml. of N,N-dimethylformamide. The reaction mixture is stirred at reflux for eight hours, cooled, and stirred with 200 ml. of saturated aqueous sodium chloride. The organic phase is separated and extracted with an excess of 3 N hydrochloric acid. The aqueous acidic extract is separated, made basic with 40 percent aqueous sodium hydroxide to pH 10.5 and extracted with ether. The ether extract is separated, dried over magnesium sulfate, and evaporated under reduced pressure to give 2-(p-chlorophenoxymethyl)pyridine, M.P. 71–73° C.

*Example 3*

A solution of 22 g. of 2-(o-methylphenoxymethyl)-pyridine in 80 ml. of ether is added at room temperature to a stirred solution of phenyllithium prepared from 2.1 g. of lithium and 24 g. of bromobenzene in 120 ml. of ether. After ten minutes, a solution of 13 g. of o-methylbenzonitrile in 75 ml. of ether is added and the reaction mixture is heated at reflux with stirring for five hours and allowed to stand overnight at room temperature. The mixture is then stirred with 200 ml. of water and the ether phase is separated, washed with sodium chloride solution, dried over magnesium sulfate, and evaporated under reduced pressure to give a residue of β-amino-2′-methyl-α-(o-methylphenoxy)-2-stilbazole; M.P. 85–88° C. following crystallization from methanol.

By the foregoing procedure, with the substitution of an equivalent amount of 2-(p-methylphenoxymethyl)pyridine for the 2-(o-methylphenoxymethyl)pyridine, the product obtained is β-amino-2′-methyl-α-(p-methylphenoxy)-2-stilbazole, M.P. 61–64° C.

By the foregoing procedure, with the substitution of an equivalent amount of 2-(m-methylphenoxymethyl)-pyridine for the 2-(o-methylphenoxymethyl)pyridine, the product obtained is β-amino-2′-methyl-α-(m-methylphenoxy)-2-stilbazole, M.P. 59–62° C.

By the foregoing procedure, with the substitution of an equivalent amount of 2-(p-ethoxyphenoxymethyl)-pyridine for the 2-(o-methylphenoxymethyl)pyridine, the product obtained is β-amino-α-(p-ethoxyphenoxy)-2′-methyl-2-stilbazole, M.P. 142–145° C.

By the foregoing procedure, with the substitution of equivalent amounts of 2-(m-methylphenoxymethyl)pyridine and o-chlorobenzonitrile for the 2-(o-methylphenoxymethyl)pyridine and o-methylbenzonitrile, the product obtained is β-amino-2′-chloro-α-(m-methylphenoxy)-2-stilbazole, M.P. 74–77° C.

By the foregoing procedure, with the substitution of equivalent amounts of 2-(p-ethoxyphenoxymethyl)pyridine and o-chlorobenzonitrile for the 2-(o-methylphenoxymethyl)pyridine and the o-methylbenzonitrile, the product obtained is β-amino-2′-chloro-α-(p-ethoxyphenoxy)-2-stilbazole, M.P. 136–139° C.

By the foregoing procedure, with the substitution of equivalent amounts of 2-(p-methylphenoxymethyl)pyridine and o-chlorobenzonitrile for the 2-(o-methylphenoxymethyl)pyridine and the o-methylbenzonitrile, the product obtained is β-amino-2′-chloro-α-(p-methylphenoxy)-2-stilbazole, M.P. 84–87° C.

By the foregoing procedure, with the substitution of an equivalent amount of o-chlorobenzonitrile for the o-methylbenzonitrile, the product obtained is β-amino-2′-chloro-α-(o-methylphenoxy)-2-stilbazole, M.P. 111–114° C.

The starting materials can be obtained by the reaction of a pyridine derivative and a phenol in the presence of sodium hydride, as described in greater detail in the preceding example. 2-(o-methylphenoxymethyl)pyridine, B.P. 105–110° C. at 0.2 mm. is prepared from 2-(chloromethyl)pyridine, o-cresol and sodium hydride. 2-(p-methylphenoxymethyl)pyridine; B.P. 120–128° C. at 0.2 mm.; hydrochloride, M.P. 128–131° C.; is prepared from 2-(chloromethyl)pyridine, p-cresol and sodium hydride. 2-(m-methylphenoxymethyl)pyridine, B.P. 108–115° C. at 0.2 mm., is prepared from 2-(chloromethyl)pyridine, m-cresol and sodium hydride. 2-(p-ethoxyphenoxymethyl)pyridine, M.P. 48–52° C. is prepared from 2-(chloromethyl)pyridine, p-ethoxyphenol and sodium hydride.

*Example 4*

A solution of 22.4 g. of 2-(o-methylphenoxymethyl)-pyridine in 80 ml. of ether is added to a stirred solution of phenyllithium prepared from 2.1 g. of lithium and 24 g. of bromobenzene in 150 ml. of ether. The solution is heated at reflux for ten minutes and then a solution of 20.5 g. of o-trifluoromethylbenzonitrile in 100 ml. of ether is added. The reaction mixture is heated at reflux for three hours, allowed to stand at room temperature for two days and stirred with 250 ml. of water. The ether phase is separated, washed with sodium chloride solution, dried over magnesium sulfate and evaporated under reduced pressure to give a residue of β-amino-2′-trifluoromethyl-α-(o-methylphenoxy)-2-stilbazole; M.P. 127–128° C. following crystallization from 95% ethanol.

*Example 5*

A solution of 22 g. of 2-phenoxymethylpyridine in 100 ml. of ether is added to a stirred solution of phenyllithium prepared from 2.1 g. of lithium and 24 g. of bromobenzene in 150 ml. of ether. The mixture is heated at reflux for 15 minutes. A solution of 21.8 g. of o-bromobenzonitrile in 100 ml. of ether is added and heating at reflux is continued for an additional three hours. The mixture is stirred with 250 ml. of water and the ether layer is separated, washed with sodium chloride solution, dried over magnesium sulfate and evaporated under reduced pressure to give a residue of β-amino-2′-bromo-α-phenoxy-2-stilbazole; M.P. 119–121° C. following crystallization from methanol.

The following additional compounds are obtained by the reaction of 2-phenoxymethylpyridine, phenyllithium, and the appropriate benzonitrile derivative according to the foregoing procedure.

From o-methoxybenzonitrile, the product is β-amino-2′-methoxy-α-phenoxy-2-stilbazole, M.P. 98–103° C.

From o-ethoxybenzonitrile, the product is β-amino-2′-ethoxy-α-phenoxy-2-stilbazole, M.P. 104–105° C.

From o-methylthiobenzonitrile, the product is β-amino-2′-methylthio-α-phenoxy-2-stilbazole, M.P. 121–124° C.

From 3-chloro-2-methylbenzonitrile, the product is β-amino - 3′-chloro-2′-methyl-α-phenoxy-2-stilbazole, M.P. 98–103° C.

From 2,3-dichlorobenzonitrile, the product is β-amino-2′,3′-dichloro-α-phenoxy-2-stilbazole, M.P. 104–109° C.

From 2-ethoxy-3-methoxybenzonitrile, the product is β - amino - 2′-ethoxy-3′-methoxy-α-phenoxy-2-stilbazole, M.P. 136–138° C.

From 2,6-dimethylbenzonitrile, the product is β-amino-2′,6′-dimethyl-α-phenoxy-2-stilbazole, M.P. 65–68° C.

From 2,6-dimethoxybenzonitrile, the product is β-amino-2′,6′-dimethoxy-α-phenoxy-2-stilbazole, M.P. 150–151° C.

From 1-naphthonitrile, the product is 2-[2-amino-2-(1-naphthyl)-1-phenoxyvinyl]pyridine, M.P. 150–153° C.

Example 6

A mixture of 5.0 g. of 2-phenoxy-2-(2-pyridyl)-α-acetonaphthone oxime, 40 ml. of 10 percent ammonia in methanol, and 1 g. of Raney nickel catalyst is shaken in a hydrogen atmosphere at 1500 pounds per square inch for three hours at 75° C. The mixture is cooled and the catalyst is removed by filtration. The filtrate is evaporated under reduced pressure to give a residue of 2 - [2 - amino-2-(1-naphthyl)-1-phenoxyvinyl]pyridine; M.P. 150–153° C. following crystallization from ethyl acetate.

The starting material can be obtained as follows. A solution of 22 g. of 2-phenoxymethylpyridine in 80 ml. of ether is added to a stirred solution of phenyllithium prepared from 2.1 g. of lithium and 24 g. of bromobenzene in 120 ml. of ether. After ten minutes, a solution of 17 g. of 1-naphthonitrile in 100 ml. of ether is added and the mixture is heated at reflux for four hours. It is then cooled and stirred with 200 ml. of water. The ether phase is separated, washed with sodium chloride solution, dried over magnesium sulfate and evaporated under reduced pressure. The residue is dissolved by warming it in 175 ml. of 85 percent phosphoric acid and the solution is poured with stirring into 2000 ml. of water. The insoluble product is collected on a filter and washed with water. It is 2-phenoxy-2-(2-pyridyl)-α-acetonaphthone; M.P. 135–138° C. following crystallization from methanol. A solution of 1.8 g. of hydroxylamine hydrochloride and 3.5 g. of sodium acetate trihydrate in 10 ml. of water is added to a solution of 8.5 g. of 2-phenoxy-2-(2-pyridyl)-α-acetonaphthone in 75 ml. of methanol. The mixture is heated at reflux for 48 hours eand evaporated to dryness under reduced pressure. The residue is stirred with 100 ml. of chloroform and 100 ml. of water. The chloroform solution is separated, washed with aqueous sodium chloride, dried over magnesium sulfate and evaporated to dryness under reduced pressure to give a residue of 2 - phenoxy-2-(2-pyridyl)-α-acetonaphthone oxime. A more highly purified product can be obtained by crystallization from ethyl acetate-hexane.

I claim:
1. A compound of the formula

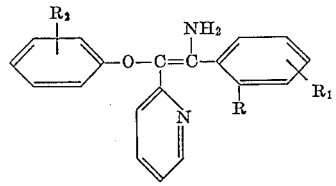

where R is a member of the class consisting of halogen, lower alkyl, lower alkoxy, trifluoromethyl, and methylthio; $R_1$ is a member of the class consisting of hydrogen, halogen, methyl, and methoxy; in combination R and $R_1$ at position 3 are the —CH=CH—CH=CH— radical; and $R_2$ is a member of the class consisting of hydrogen, halogen, lower alkyl and lower alkoxy.

2. β-amino-2′-(lower alkyl)-α-phenoxy-2-stilbazole.
3. β-amino-2′-methyl-α-phenoxy-2-stilbazole.
4. β-amino-2′-trifluoromethyl-α-phenoxy-2- stilbazole.
5. 2 - [2 - amino - 2-(1-naphthyl)-1-phenoxyvinyl]-pyridine.

References Cited by the Examiner
UNITED STATES PATENTS
3,156,698   11/1964   De Wald et al. _____ 260—296

WALTER A. MODANCE, *Primary Examiner.*
ALAN L. ROTMAN, *Assistant Examiner.*